(12) United States Patent　　(10) Patent No.: US 8,666,014 B2
Suzuki　　(45) Date of Patent: Mar. 4, 2014

(54) REPRODUCTION APPARATUS

(71) Applicant: Panasonic Corporation, Osaka (JP)

(72) Inventor: Hiroaki Suzuki, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/712,615

(22) Filed: Dec. 12, 2012

(65) Prior Publication Data

US 2013/0202024 A1　Aug. 8, 2013

(30) Foreign Application Priority Data

Feb. 3, 2012　(JP) ................................. 2012-021920

(51) Int. Cl.
*H04L 23/00*　　(2006.01)
(52) U.S. Cl.
USPC ............... 375/377; 700/94; 381/307; 381/28; 360/39
(58) Field of Classification Search
USPC ......... 375/240.01, 262, 377; 381/307, 10, 27, 381/28, 59, 77, 85; 360/39, 55, 61; 700/94; 455/3.06
See application file for complete search history.

(56) References Cited

U.S. PATENT DOCUMENTS

| | | | | |
|---|---|---|---|---|
| 5,619,197 | A * | 4/1997 | Nakamura | 341/50 |
| 5,646,931 | A * | 7/1997 | Terasaki | 369/124.08 |
| 5,917,781 | A * | 6/1999 | Kim | 369/4 |
| 6,694,027 | B1 * | 2/2004 | Schneider | 381/20 |
| 7,266,501 | B2 * | 9/2007 | Saunders et al. | 704/500 |
| 7,606,716 | B2 * | 10/2009 | Kraemer | 704/500 |
| 2004/0008847 | A1 * | 1/2004 | Kim | 381/18 |
| 2008/0118078 | A1 | 5/2008 | Asada et al. | |
| 2008/0130924 | A1 * | 6/2008 | Vaudrey et al. | 381/311 |
| 2008/0131085 | A1 * | 6/2008 | Ikeda et al. | 386/99 |

FOREIGN PATENT DOCUMENTS

| | | |
|---|---|---|
| JP | 08-077711 | 3/1996 |
| JP | 08-182085 | 7/1996 |
| JP | 2007-116301 | 5/2007 |
| JP | 2008-131089 | 6/2008 |

* cited by examiner

*Primary Examiner* — Jean B Corrielus
(74) *Attorney, Agent, or Firm* — Renner, Otto, Boisselle & Sklar, LLP

(57) ABSTRACT

A reproduction apparatus includes a setter configured to set at least one language, a separator configured to separate and output a video signal and an audio signal, a video signal processor configured to decode and encode the video signal, a first decoder configured to output a first center channel signal and a multi-channel signal generated by extraction of the first center channel signal, a second decoder configured to output a second center channel signal, and a selector configured to receive the first and second center channel signals and assign, according to a setting in the setter, the first and second center channel signals respectively to different outputs.

4 Claims, 2 Drawing Sheets

FIG.2

| LANGUAGE | OUPUT |
|---|---|
| JAPANESE | AMPLIFIER 114a |
| ENGLISH | AMPLIFIER 114b |
| KOREAN | AMPLIFIER 114c |

REPRODUCTION APPARATUS

CROSS-REFERENCE TO RELATED APPLICATION

This application claims priority to Japanese Patent Application No. 2012-021920 filed on Feb. 3, 2012, the disclosure of which including the specification, the drawings, and the claims is hereby incorporated by reference in its entirety.

BACKGROUND

The present disclosure relates to a reproduction apparatus configured to perform multi-channel surround sound reproduction.

Japanese Patent Publication No. 2007-116301 describes a reproduction apparatus configured to provide, for viewing and listening of contents by a plurality of viewers, the contents together with sound through headphones in a language selected from a plurality of languages by each of the viewers. This allows the viewers to view and listen to the contents in the languages selected by themselves.

SUMMARY

The present disclosure describes a reproduction apparatus configured to perform, when a plurality of languages are set for viewing and listening of contents, multi-channel surround sound reproduction of the contents in the plurality of languages at a time.

The present disclosure describes a reproduction apparatus for performing multi-channel surround sound reproduction of contents including a video signal and audio signals corresponding respectively to a plurality of languages. The reproduction apparatus includes a setter configured to set at least one of the plurality of languages; a separator configured to separate the contents into the video signal and the audio signals corresponding respectively to the plurality of languages set in the setter to output the video signal and the audio signals; a video signal processor configured to decode and encode the video signal output from the separator; a first decoder configured to decode, after receipt of one of the audio signals corresponding respectively to the plurality of languages set in the setter from the separator, the one of the audio signals to generate a multi-channel surround audio signal including a first center channel signal, to extract the first center channel signal from the multi-channel surround audio signal, and to output the first center channel signal and a multi-channel signal generated by extraction of the first center channel signal; a second decoder configured to decode, after receipt of other one of the audio signals different from the one of the audio signals decoded by the first decoder from the separator, the other one of the audio signals to generate a multi-channel surround audio signal including a second center channel signal, to extract the second center channel signal from the multi-channel surround audio signal, and to output the second center channel signal; and a selector configured to receive the first and second center channel signals and to assign, according to settings in the setter, the first and second center channel signals respectively to different outputs.

When a plurality of languages for viewing and listening of contents are set, the reproduction apparatus of the present disclosure can perform multi-channel surround sound reproduction of the contents in the plurality of languages at a time.

BRIEF DESCRIPTION OF THE DRAWINGS

FIG. 2 illustrates an example of a user interface when languages are set in the reproduction system illustrated in FIG. 1.

DETAILED DESCRIPTION

Figure 1:
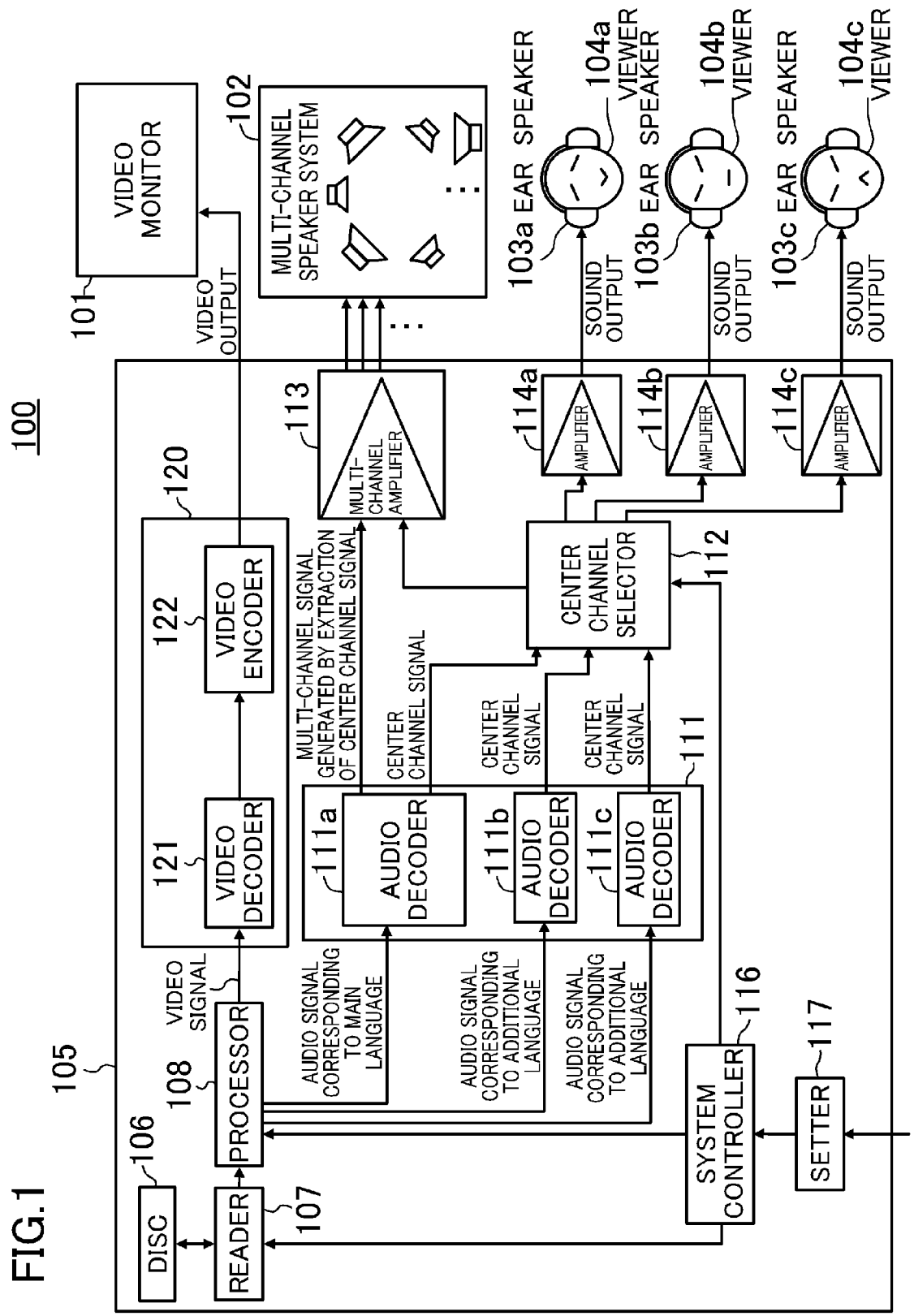
FIG. 1 is a block diagram illustrating a configuration of a reproduction system of a first embodiment.

Embodiments are described in detail below with reference to the attached drawings. However, unnecessarily detailed description may be omitted. For example, detailed description of well known techniques or description of the substantially same elements may be omitted. Such omission is intended to prevent the following description from being unnecessarily redundant and to help those skilled in the art easily understand it.

Inventors provide the following description and the attached drawings to enable those skilled in the art to fully understand the present disclosure. Thus, the description and the drawings are not intended to limit the scope of the subject matter defined in the claims.

First Embodiment

A first embodiment will be described below with reference to FIGS. 1 and 2.

[1-1. Configuration]

[1-1-1. Configuration of Reproduction System]

FIG. 1 is a block diagram illustrating a configuration of a reproduction system of the first embodiment. A reproduction system 100 illustrated in FIG. 1 is configured to perform multi-channel surround sound reproduction of contents stored in an optical disc such as digital versatile discs (DVDs) and Blu-ray Discs (registered trademark).

The reproduction system 100 includes a video monitor 101, a multi-channel speaker system 102, ear speakers 103a-103c, and a reproduction apparatus 105.

The video monitor 101 is configured to receive a video output from the reproduction apparatus 105 to display a video image.

The multi-channel speaker system 102 is a speaker system configured to perform multi-channel surround sound reproduction such as 5.1 surround sound reproduction.

The ear speakers 103a-103c are speakers each configured to reproduce sound in a desired language selected by each of viewers 104a-104c, and arranged near ears of the viewers 104a-104c. That is, the viewers 104a-104c can share a video image, sound effects, etc. through the video monitor 101 and the multi-channel speaker system 102, and can listen to sound through the ear speakers 103a-103c in desired languages selected by themselves.

[1-1-2. Configuration of Reproduction Apparatus]

The reproduction apparatus 105 includes a disc 106, a reader 107, a processor 108 serving as a separator, an audio decoder 111, a video signal processor 120, a center channel selector 112, a multi-channel amplifier 113, amplifiers 114a-114c, a system controller 116, and a setter 117.

The disc 106 is a medium such as optical discs each storing contents. The contents include a video signal and audio signals corresponding to a plurality of languages.

The setter 117 is configured to establish various settings for reproduction of the contents. The setter 117 establishes, e.g., a setting for reproducing the contents in languages such as Japanese and English, and a setting for designating a reproduction position (e.g., tracks and chapters) of the contents. For viewing and listening of the contents by the viewers 104a-104c at a time, at least one of the languages for viewing and listening of the contents is set in the setter 117. For example, referring to FIG. 2, three types (Japanese, English, and Korean) of language and the amplifiers 114a-114c through each of which sound is output in a corresponding one of the languages are set in the setter 117.

FIG. 2 illustrates an example of a user interface when the languages are set in the reproduction system illustrated in FIG. 1. Referring to FIG. 2, since the languages for viewing and listening of the contents and the outputs through each of which sound is output in a corresponding one of the languages are set in the setter 117, the viewers 104a-104c can receive sound output from the amplifiers 114a-114c through the ear speakers 103a-103c. This allows the viewers 104a-104c to view and listen to the contents in Japanese, English, and Korean at a time.

Referring back to FIG. 1, the system controller 116 is configured to send, according to the settings in the setter 117, commands to the reader 107, the processor 108, and the center channel selector 112 to control an operation.

The reader 107 is configured to read out, according to the command from the system controller 116, the contents from the disc 106 to output the contents to the processor 108. Note that the reader 107 may read out audio signals corresponding to all languages contained in the contents, or may read out an audio signal(s) corresponding to a language(s) set in the setter 117.

The processor 108 is configured to separate, according to the command from the system controller 116, the contents received from the reader 107 into a video signal and an audio signal(s) corresponding to a language(s) set in the setter 117. In the present embodiment, the processor 108 separates the contents into a video signal, an audio signal (audio signal corresponding to a main language) corresponding to Japanese, an audio signal (audio signal corresponding to an additional language) corresponding to English, and an audio signal (audio signal corresponding to another additional language) corresponding to Korean. Then, the processor 108 outputs the video signal to the video signal processor 120, and outputs the audio signal(s) to the audio decoder 111. The "audio signal corresponding to the main language" is an audio signal corresponding to a language selected from a plurality of languages contained in contents and set as a first priority in the setter 117. The "audio signal corresponding to the additional language" is an audio signal other than the audio signal corresponding to the main language.

The video signal processor 120 includes a video decoder 121 and a video encoder 122. The video signal processor 120 is configured to decode and encode the video signal output from the processor 108 to generate a video output. Then, the video signal processor 120 supplies the video output to the video monitor 101.

The audio decoder 111 includes an audio decoder 111a serving as a first decoder, an audio decoder 111b serving as a second decoder, and an audio decoder 111c.

The audio decoder 111a is configured to decode the audio signal output from the processor 108 to generate a multi-channel surround audio signal including a first center channel signal. Specifically, the audio decoder 111a decodes the audio signal corresponding to the main language (i.e., the audio signal corresponding to Japanese). That is, the first center channel signal corresponds to the audio signal corresponding to Japanese. Then, the audio decoder 111a extracts the first center channel signal from the surround audio signal to output the first center channel signal to the center channel selector 112, and outputs a multi-channel signal generated by extraction of the first center channel signal to the multi-channel amplifier 113.

The audio decoder 111b is configured to decode the audio signal which is output from the processor 108 and which is different from the audio signal input to the audio decoder 111a to generate a multi-channel surround audio signal including a second center channel signal. Specifically, the audio decoder 111b decodes the audio signal corresponding to the additional language (i.e., the audio signal corresponding to English). That is, the second center channel signal corresponds to the audio signal corresponding to English. Then, the audio decoder 111b extracts the second center channel signal from the surround audio signal to output the second center channel signal to the center channel selector 112.

The audio decoder 111c is configured to decode the audio signal which is output from the processor 108 and which is different from the audio signals input to the audio decoders 111a, 111b to generate a multi-channel surround audio signal including a third center channel signal. Specifically, the audio decoder 111c decodes the audio signal corresponding to the another additional language (i.e., the audio signal corresponding to Korea). That is, the third center channel signal corresponds to the audio signal corresponding to Korean. Then, the audio decoder 111c extracts the third center channel signal from the surround audio signal to output the third center channel signal to the center channel selector 112.

The center channel selector 112 is configured to assign, upon receipt of the command from the system controller 116, the plurality of center channel signals output from the audio decoder 111 to different outputs according to the settings in the setter 117. Specifically, the center channel selector 112 outputs the first center channel signal corresponding to Japanese to the amplifier 114a, outputs the second center channel signal corresponding to English to the amplifier 114b, and outputs the third center channel signal corresponding to Korean to the amplifier 114c. The center channel selector 112 may be configured as follows. When a single language is set in the setter 117, the center channel selector 112 outputs any of the input center channel signals to the multi-channel amplifier 113 so that normal multi-channel reproduction can be performed instead of sound reproduction through the ear speakers 103a-103c.

The multi-channel amplifier 113 is configured to amplify the multi-channel signal output from the audio decoder 111a with the center channel signal being extracted. The amplified multi-channel signal is output to the multi-channel speaker system 102. The multi-channel amplifier 113 may be configured as follows. When a single language is set in the setter 117, the multi-channel amplifier 113 amplifies the center channel signal output from the center channel selector 112 to output the amplified center channel signal to the multi-channel speaker system 102 so that the normal multi-channel reproduction can be performed instead of the sound reproduction through the ear speakers 103a-103c.

Each of the amplifiers 114a-114c is configured to amplify the center channel signal output from the center channel selector 112 to generate sound output and to send the sound output to a corresponding one of ear speakers 103a-103c. Specifically, the amplifiers 114a-114c amplify the first, second, and third center channel signals, respectively.

[1-2. Operation of Reproduction System]

An operation of the reproduction system 100 configured as described above will be described below.

For example, when the settings illustrated in FIG. 2 are established in the setter 117 by the viewer 104a, the processor 108 separates, according to the settings in the setter 117, contents read by the reader 107 into a video signal, an audio signal corresponding to Japanese, an audio signal corresponding to English, and an audio signal corresponding to Korea. Then, the processor 108 outputs such signals.

The video signal is decoded and encoded by the video signal processor 120. Then, upon receipt of the video output from the video signal processor 120, an image is displayed on the video monitor 101.

The audio signals from the processor 108 are decoded by the audio decoder 111. Then, the audio decoder 111a outputs a center channel signal corresponding to Japanese and a multi-channel signal generated by extraction of the center channel signal. In addition, the audio decoders 111b, 111c output a center channel signal corresponding to English and a center channel signal corresponding to Korean, respectively.

The center channel signals output from the audio decoders 111a-111c are input to the center channel selector 112. According to the settings in the setter 117, the center channel selector 112 assigns and outputs the center channel signals to corresponding ones of the amplifiers 114a-114c.

A multi-channel signal output from the audio decoder 111a with the center channel signal being extracted is amplified by the multi-channel amplifier 113 and is output to the multi-channel speaker system 102. This allows multi-channel surround sound reproduction.

The viewer 104a can receive sound output in Japanese through the amplifier 114a and the ear speaker 103a. The viewer 104b can receive sound output in English through the amplifier 114b and the ear speaker 103b. The viewer 104c can receive sound output in Korean through the amplifier 114c and the ear speaker 103c.

[1-3. Advantages Etc.]

As described above, in the present embodiment, when the plurality of languages for viewing and listening of the contents are set, the multi-channel surround sound reproduction of the contents can be performed in the plurality of languages at a time. That is, in the reproduction apparatus 105 of the present embodiment, the processor 108 separates the contents into the video signal and the audio signals corresponding to the three types of language set in the setter 117, and the audio decoders 111a-111c generate the multi-channel surround audio signals respectively including the center channel signals corresponding respectively to the languages. Then, the audio decoder 111a outputs the first center channel signal and the multi-channel signal generated by extraction of the first center channel in the state in which such signals are separated from each other. In addition, the audio decoders 111b, 111c output the second and third center channel signals, respectively. That is, upon viewing and listening of contents, there are a single type of video signal, a single type of multi-channel signal generated by extraction of a center channel signal, and three types of center channel signal. Thus, by simultaneously reproducing such signals, the multi-channel surround sound reproduction of the contents can be performed in the plurality of languages at a time.

Specifically, the multi-channel surround sound reproduction of the multi-channel signal generated by extraction of the center channel signal is performed by the multi-channel speaker system 102. The center channel selector 112 assigns, according to the settings in the setter 117, the center channel signals to the outputs, i.e., the amplifiers 114a-114c. Each of the center channel signals is amplified by a corresponding one of the amplifiers 114a-114c, and is output to a corresponding one of ear speakers 103a-103c of the viewers 104a-104c.

Contents stored in an optical disc, such as movies, are often produced on the assumption that a viewer enjoys, with a video image, multi-channel surround sound reproduction performed by a multi-channel speaker system. Of multi-channel surround audio signals, a center channel signal is often assigned to, e.g., dialogues of characters, and a multi-channel signal generated by extraction of the center channel signal is often assigned to, e.g., sound effects.

In the present embodiment, since the center channel signals are used as signals representing the languages, the viewers 104a-104c can simultaneously listen, e.g., dialogues of characters of the contents through the ear speakers 103a-103c in the desired languages selected by themselves. In addition, since the multi-channel signal generated by extraction of the center channel signal is reproduced by the multi-channel speaker system 102, and the video image is reproduced by the video monitor 101, the viewers 104a-104c can view the contents with, e.g., the sound effects and the video image thereof. That is, according to the reproduction system of the present embodiment, the multi-channel surround sound reproduction of the contents can be performed in the plurality of languages at a time, and interference between the languages selected by the plurality of viewers can be reduced.

A conventional reproduction apparatus is configured such that a plurality of viewers share a video image while listening to contents through their own headphones. According to such a reproduction apparatus, although each of the viewers can listen, e.g., sound effects in one's desired language through one's own headphones without interference, it is difficult that multi-channel surround sound reproduction using a multi-channel speaker system is realized. That is, since it is difficult to apply the conventional reproduction apparatus to an existing multi-channel speaker system, it is not suitable for a viewer to enjoy a surround effect while viewing and listening to contents.

On the other hand, in the present embodiment, the existing multi-channel speaker system can be used. In addition, the viewers 104a-104c can enjoy the surround effect while viewing and listening to the contents in the desired languages selected by themselves at a time.

Other Embodiment

As described above, the first embodiment has been described as example techniques disclosed in the present application. However, the techniques according to the present disclosure are not limited to such an embodiment, but are also applicable to those where modifications, substitutions, additions, and omissions are made. In addition, elements described in the first embodiment may be combined to provide a different embodiment.

Other embodiment will be exemplified below.

In the first embodiment, the amplifiers 114a-114c are provided. However, any one of the amplifiers 114a-114c may be replaced with an amplifier configured to amplify a center channel signal input to the multi-channel amplifier 113. For example, the amplifier 114a may be omitted. In addition, the center channel signal corresponding to the main language may be amplified by an amplifier for the center channel signal in the multi-channel amplifier 113, and may be output to the ear speaker 103a. In such a case, the multi-channel amplifier 113 may be configured to switch, according to a command from the system controller 116, an output of the center channel signal between the multi-channel speaker system 102 and the ear speaker 103a. This reduces the number of amplifiers, resulting in reduction in size and cost of the reproduction apparatus 105.

In the first embodiment, there are three audio decoders 111a-111c, three inputs/outputs to/from the center channel selector 112, three amplifiers 114a-114c, and three ear speakers 103a-103c. However, the number of each of the foregoing may be two or more. In such a case, depending on the number of each of the foregoing, the number of languages which can be set in the setter 117 and the number of languages which can be processed by the system controller 116 and the processor 108 may be determined.

In the first embodiment, when two types of language, e.g., Japanese and English, are set in the setter 117, the center channel selector 112 may output, e.g., center channel signals corresponding to Japanese respectively to the amplifiers 114a, 114c and may output, e.g., a center channel signal corresponding to English to the amplifier 114b according to the settings in the setter 117. That is, center channel signals corresponding to the same language may be output respectively to different amplifiers.

In the first embodiment, when a single type of language is set in the setter 117, a center channel signal corresponding to such a language may be output not from the ear speakers 103a-103c but from, e.g., a center speaker of the multi-channel speaker system 102 through the center channel selector 112 and the multi-channel amplifier 113. This allows the viewers 104a-104c to simultaneously view and listen to the contents in the same language by the multi-channel surround sound reproduction.

As described above, when one or two types of language are set in the setter 117, the processor 108 may separate an audio signal(s) corresponding to a language(s) which is not set in the setter 117 from the contents, and may output such an audio signal(s). In such a case, the center channel selector 112 may be configured not to output a center channel signal(s) corresponding to the language(s) which is not set in the setter 117. For example, when Japanese is set in the setter 117, the center channel selector 112 does not output center channel signals corresponding to English and Korean. Alternatively, an operation of the audio decoders to which audio signals corresponding to English and Korean are respectively input may be stopped.

While the viewers 104a-104c are viewing and listening to the contents, the settings in the setter 117 may be changed. For example, referring to FIG. 2, the setting for outputting the audio signal corresponding to English to the amplifier 114b may be changed to the setting for outputting the audio signal corresponding to Japanese to the amplifier 114b.

In the first embodiment, the audio decoder 111a decodes the audio signal corresponding to the main language to generate the multi-channel signal. However, e.g., any of the audio decoders 111b, 111c may decode the audio signal corresponding to the additional language to generate the multi-channel signal.

In the first embodiment, the disc 106 and the reader 107 may be provided outside the reproduction apparatus 105. That is, the contents may be input to the reproduction apparatus 105 from outside. For example, the contents may be input to the reproduction apparatus 105 through digital broadcasting or the Internet.

In the first embodiment, the amplifiers 114a-114c and the multi-channel amplifier 113 may be provided outside the reproduction apparatus 105. In addition, the system controller 116 and the setter 117 may be integrally configured. That is, the processor 108 and the center channel selector 112 may be configured to perform the foregoing operation according to the settings in the setter 117.

Various embodiments have been described above as example techniques of the present disclosure, in which the attached drawings and the detailed description are provided.

As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

The present disclosure is applicable to a reproduction apparatus configured to perform multi-channel surround sound reproduction of contents. Specifically, the present disclosure is applicable to the case where a plurality of viewers simultaneously perform multi-channel surround sound reproduction of contents in a plurality of languages selected by themselves.

What is claimed is:

1. A reproduction apparatus for performing multi-channel surround sound reproduction of contents including a video signal and audio signals corresponding respectively to a plurality of languages, the reproduction apparatus comprising:
    a setter configured to set at least one of the plurality of languages;
    a separator configured to separate the contents into the video signal and the audio signals corresponding respectively to the plurality of languages set in the setter to output the video signal and the audio signals;
    a video signal processor configured to decode and encode the video signal output from the separator;
    a first decoder configured to decode, after receipt of one of the audio signals corresponding respectively to the plurality of languages set in the setter from the separator, the one of the audio signals to generate a multi-channel surround audio signal including a first center channel signal, to extract the first center channel signal from the multi-channel surround audio signal, and to output the first center channel signal and a multi-channel signal generated by extraction of the first center channel signal;
    a second decoder configured to decode, after receipt of other one of the audio signals different from the one of the audio signals decoded by the first decoder from the separator, the other one of the audio signals to generate a multi-channel surround audio signal including a second center channel signal, to extract the second center channel signal from the multi-channel surround audio signal, and to output the second center channel signal; and
    a selector configured to receive the first and second center channel signals and to assign, according to settings in the setter, the first and second center channel signals respectively to different outputs.

2. The reproduction apparatus of claim 1, wherein
    the multi-channel signal is reproduced by a multi-channel speaker system, and
    each of the first and second center channel signals is reproduced by a corresponding one of ear speakers.

3. The reproduction apparatus of claim 1, further comprising:
    a multi-channel amplifier configured to amplify the multi-channel signal and output of the selector,
    wherein the selector outputs, when a single language is set in the setter, one of the first and second center channel signals corresponding to the single language to the multi-channel amplifier.

4. The reproduction apparatus of claim 1, further comprising:
a plurality of amplifiers,
wherein the selector assigns and outputs, according to the settings in the setter, the first and second center channel signals respectively to the plurality of amplifiers different from each other.

* * * * *